(12) United States Patent
Richter et al.

(10) Patent No.: US 11,423,604 B2
(45) Date of Patent: Aug. 23, 2022

(54) METHOD AND DEVICE FOR TAILORING A SYNTHESIZED REALITY EXPERIENCE TO A PHYSICAL SETTING

(71) Applicant: Apple Inc., Cupertino, CA (US)

(72) Inventors: Ian M. Richter, Los Angeles, CA (US); Maxime Meilland, Sunnyvale, CA (US); Patrick W. O'Keefe, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/397,437

(22) Filed: Aug. 9, 2021

(65) Prior Publication Data

US 2021/0366179 A1 Nov. 25, 2021

Related U.S. Application Data

(63) Continuation of application No. 16/960,163, filed as application No. PCT/US2019/014307 on Jan. 18, 2019, now Pat. No. 11,120,612.

(Continued)

(51) Int. Cl.
*G06T 19/00* (2011.01)
*G06T 15/08* (2011.01)
(Continued)

(52) U.S. Cl.
CPC ............ *G06T 15/08* (2013.01); *G02B 27/017* (2013.01); *G06F 3/011* (2013.01); *G06T 17/20* (2013.01); *G06T 19/006* (2013.01)

(58) Field of Classification Search
None
See application file for complete search history.

(56) References Cited

U.S. PATENT DOCUMENTS

| 2014/0132484 A1 | 5/2014 | Pandey et al. |
| 2014/0168262 A1 | 6/2014 | Forutanpour et al. |
| 2017/0358140 A1 | 12/2017 | Kohler et al. |

FOREIGN PATENT DOCUMENTS

| CN | 104871214 A | 8/2015 |
| CN | 109615704 A | 4/2019 |

(Continued)

OTHER PUBLICATIONS

Chinese Office Action dated Sep. 1, 2021, Chinese Application No. 201980008418.8, pp. 1-8 (Includes English Translation of Search Report).

(Continued)

*Primary Examiner* — Nicholas R Wilson
(74) *Attorney, Agent, or Firm* — Fernando & Partners, LLP

(57) ABSTRACT

In one implementation, a method includes: obtaining locality data characterizing objects and relative spatial information of a volumetric region around a user; synthesizing a mesh map of the volumetric region based on the locality data; selecting synthesized reality (SR) content based on the mesh map, wherein the SR content satisfies a dimensional variance threshold relative to one or more portions of the mesh map; compositing at least a portion of the SR content with the mesh map in order to generate composite SR content; and presenting the composite SR content to the user in order to occlude at least a portion of a visual presentation of the volumetric region. In some implementations, the SR content is adapted to fit the one or more portions of the mesh map. In some implementations, the SR content is updated as the user location changes or the user interacts with the SR content.

23 Claims, 13 Drawing Sheets

Related U.S. Application Data

(60) Provisional application No. 62/734,066, filed on Sep. 20, 2018, provisional application No. 62/620,345, filed on Jan. 22, 2018.

(51) Int. Cl.
  *G02B 27/01* (2006.01)
  *G06F 3/01* (2006.01)
  *G06T 17/20* (2006.01)

(56) References Cited

FOREIGN PATENT DOCUMENTS

| WO | 2014078037 A2 | 5/2014 |
| WO | 2014099231 A2 | 6/2014 |

OTHER PUBLICATIONS

International Search Report and Written Opinion dated Apr. 18, 2019, International Application No. PCT/US2019/014307, pp. 1-14.

Brett R. Jones et al., "IllumiRoom: peripheral projected illusions for interactive experiences," Proceedings of the SIGCHI Conference on Human Factors in Computing Systems, 2013, pp. 869-878.

Oliver Bimber et al., "Spatial augmented reality: merging real and virtual worlds" Chapter 3: Augmented Reality Displays, CRC press, Aug. 2005, pp. 71-92.

Sebastian Lieberknecht et al., "RGB-D Camera-Based Parallel Tracking and Meshing," 2011 10th IEEE International Symposium on Mixed and Augmented Reality, 2011, pp. 147-155.

METHOD AND DEVICE FOR TAILORING A SYNTHESIZED REALITY EXPERIENCE TO A PHYSICAL SETTING

CROSS-REFERENCE TO RELATED APPLICATIONS

This application is a continuation of U.S. patent application Ser. No. 16/960,163, filed on Jul. 6, 2020, which claims priority to International Patent App. No. PCT/US2019/014307, filed Jan. 18, 2019, which claims priority to U.S. Provisional Patent App. No. 62/734,066, filed on Sep. 20, 2018, and U.S. Provisional Patent App. No. 62/620,345, filed on Jan. 22, 2018, which are hereby incorporated by reference herein in their entireties.

TECHNICAL FIELD

The present disclosure generally relates to synthesized reality (SR) content consumption, and in particular, to systems, methods, and devices for tailoring an SR experience to a physical setting.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space so their VR perception is different from his/her real-world perception. In contrast, AR takes the user's real-world perception and adds something to it.

These technologies are becoming more commonplace due to, for example, miniaturization of hardware components, improvements to hardware performance, and improvements to software efficiency. As one example, a user may experience AR content superimposed on a live video feed of the user's setting on a handheld display (e.g., an AR-enabled mobile phone or tablet with video pass-through). As another example, a user may experience AR content by wearing a head-mounted device (HMD) or head-mounted enclosure that still allows the user to see his/her surroundings (e.g., glasses with optical see-through). As yet another example, a user may experience VR content by using an HMD that encloses the user's field-of-view and is tethered to a computer.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
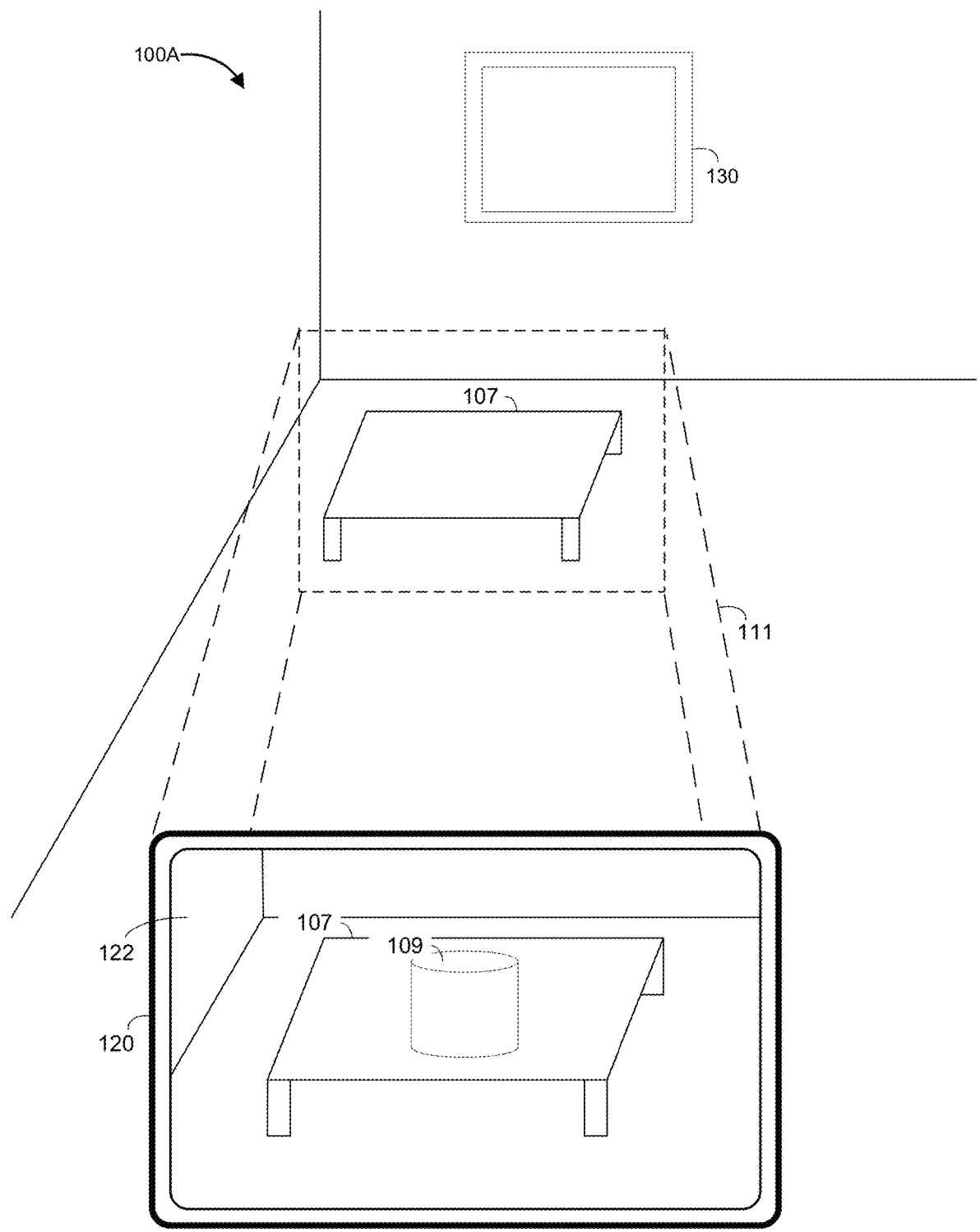
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting synthesized reality (SR) content. According to some implementations, the method is performed at a device including non-transitory memory and one or more processors coupled with the non-transitory memory. The method includes: obtaining locality data characterizing objects and relative spatial information of a volumetric region around a user; synthesizing a mesh map of the volumetric region based on the locality data; selecting SR content based on the mesh map, wherein the SR content satisfies a dimensional variance threshold relative to one or more portions of the mesh map; compositing at least a portion of the SR content with the mesh map in order to generate composite SR content; and presenting the composite SR content to the user in order to occlude at least a portion of a visual presentation of the volumetric region.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

The implementations described herein provide methods and devices for tailoring a synthesized reality (SR) experience to a physical setting. For example, while a user is watching a movie in his/her living room on a television (TV), the user may wish to experience a more immersive version of the movie where portions of the user's living room may become part of the movie scenery. For example, based on the dimensions of the living room, the furniture within the living room, and the user's orientation/location within the living room, the SR content is overlaid on portions of the user's living room. In some implementations, the SR content corresponds to portions of the movie reconstructed in SR (e.g., background and peripheral scenery from the movie projected onto the walls and/or floor of the living room). In some implementations, the SR content corresponds to auxiliary SR content related to the movie (e.g., maps, graphs, educational information, or the like augmenting the movie). As such, in some implementations, the SR content associated with the movie "skins" at least a portion of the living room (e.g., an at-home holodeck). In some implementations, the SR content is 2-dimensional (e.g., flat), volumetric, and/or a suitable combination thereof.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an electronic device 120 and an optional display device 130.

In some implementations, the electronic device 120 is configured to present the SR experience to a user. In some implementations, the electronic device 120 includes a suitable combination of software, firmware, and/or hardware. The electronic device 120 is described in greater detail below with respect to FIG. 3. According to some implementations, the electronic device 120 presents a synthesized reality (SR) experience to the user while the user is physically present within a physical setting 103 that includes a table 107 within the field-of-view 111 of the electronic device 120. As such, in some implementations, the user holds the electronic device 120 in his/her hand(s). In some implementations, while presenting an augmented reality (AR) experience, the electronic device 120 is configured to present AR content (e.g., an AR cylinder 109) and to enable video pass-through of the physical setting 103 (e.g., including the table 107) on a display 122.

In some implementations, the display device 130 is configured to present media content (e.g., video and/or audio content) to the user. In some implementations, the display device 130 corresponds to a television or a computing device such as a desktop computer, kiosk, laptop computer, tablet, mobile phone, wearable computing device, or the like. In some implementations, the display device 130 includes a suitable combination of software, firmware, and/or hardware. The display device 130 is described in greater detail below with respect to FIG. 4.

Figure 1B:
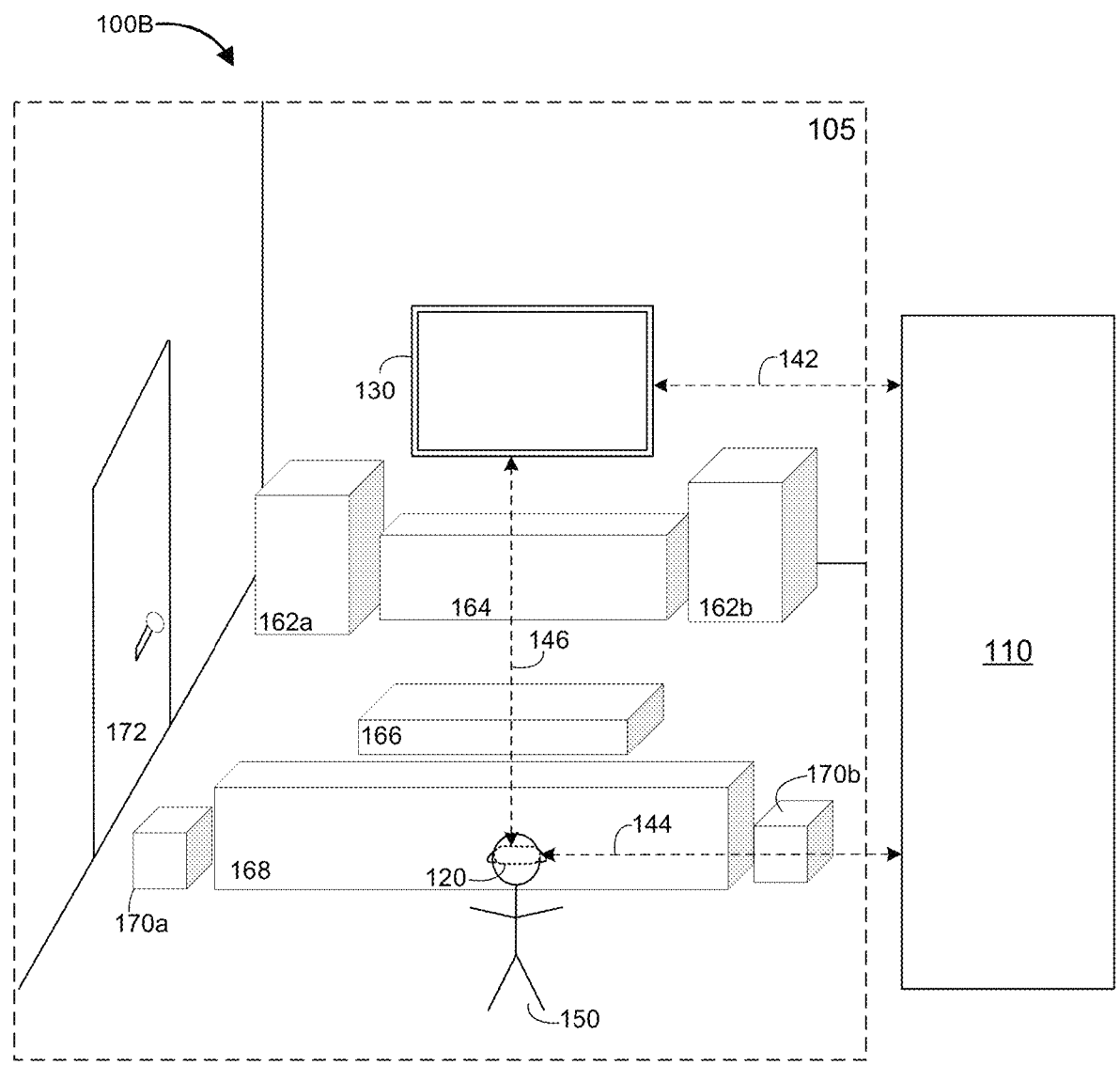
FIG. 1B is a block diagram of another example operating architecture in accordance with some implementations.

FIG. 1B is a block diagram of an example physical setting 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical setting 100B includes a controller 110, an electronic device 120, and an optional display device 130.

In some implementations, the controller 110 is configured to manage and coordinate an SR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical setting 105. For example, the controller 110 is a local server located within the physical setting 105. In another example, the controller 110 is a remote server located outside of the physical setting 105 (e.g., a cloud server, central server, etc.).

In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the controller 110 is communicatively coupled with the display device 130 via one or more wired or wireless communication channels 142 (e.g., BLUETOOTH, IEEE 802.11x, IEEE 802.16x, IEEE 802.3x, etc.). In some implementations, the electronic device 120 is communicatively coupled with the display device 130 via one or more wired or wireless communication channels 146 (e.g., BLUETOOTH, IEEE 802.11x, IEEE 802.16x, IEEE 802.3x, etc.).

In some implementations, the electronic device 120 is configured to present the SR experience to the user 150. In some implementations, the electronic device 120 includes a suitable combination of software, firmware, and/or hardware. The electronic device 120 is described in greater detail below with respect to FIG. 3. In some implementations, the functionalities of the controller 110 and/or the display device 130 are provided by and/or combined with the electronic device 120.

According to some implementations, the electronic device 120 presents an SR experience to the user 150 while the user 150 is virtually and/or physically present within the physical setting 105. In some implementations, while presenting an augmented reality (AR) experience, the electronic device 120 is configured to present AR content and to enable optical see-through of the physical setting 105 (e.g., the electronic device 120 corresponds to an AR-enabled glasses). In some implementations, while presenting a virtual reality (VR) experience, the electronic device 120 is configured to present VR content and to optionally enable video pass-through of the physical setting 105 (e.g., the electronic device 120 corresponds to a VR-enabled HMD). As shown in FIG. 1, for example, the physical setting 105 includes chairs 162a and 162b, credenza 164, coffee table 166, sofa 168, end tables 170a and 170b, and a door 172. As shown in FIG. 1, the user 150 is standing behind the sofa 168 facing the display device 130.

In some implementations, the user 150 wears the electronic device 120 on his/her head such as a head-mounted device (HMD). As such, the electronic device 120 includes one or more displays provided to display the SR content. For example, the electronic device 120 encloses the field-of-view of the user 150. As another example, the electronic device 120 slides into or otherwise attaches to a head mounted enclosure. In some implementations, the electronic device 120 is replaced with an SR chamber, enclosure, or room configured to present SR content in which the user 150 does not wear the electronic device 120. In some implementations, the user 150 holds the electronic device 120 in his/her hand(s).

In some implementations, the optional display device 130 is configured to present media content (e.g., video and/or audio content) to the user 150. In some implementations, the display device 130 corresponds to a television (TV) or a computing device such as a desktop computer, kiosk, laptop computer, tablet, mobile phone, wearable computing device, or the like. In some implementations, the display device 130 includes a suitable combination of software, firmware, and/or hardware. The display device 130 is described in greater detail below with respect to FIG. 4.

Figure 2:
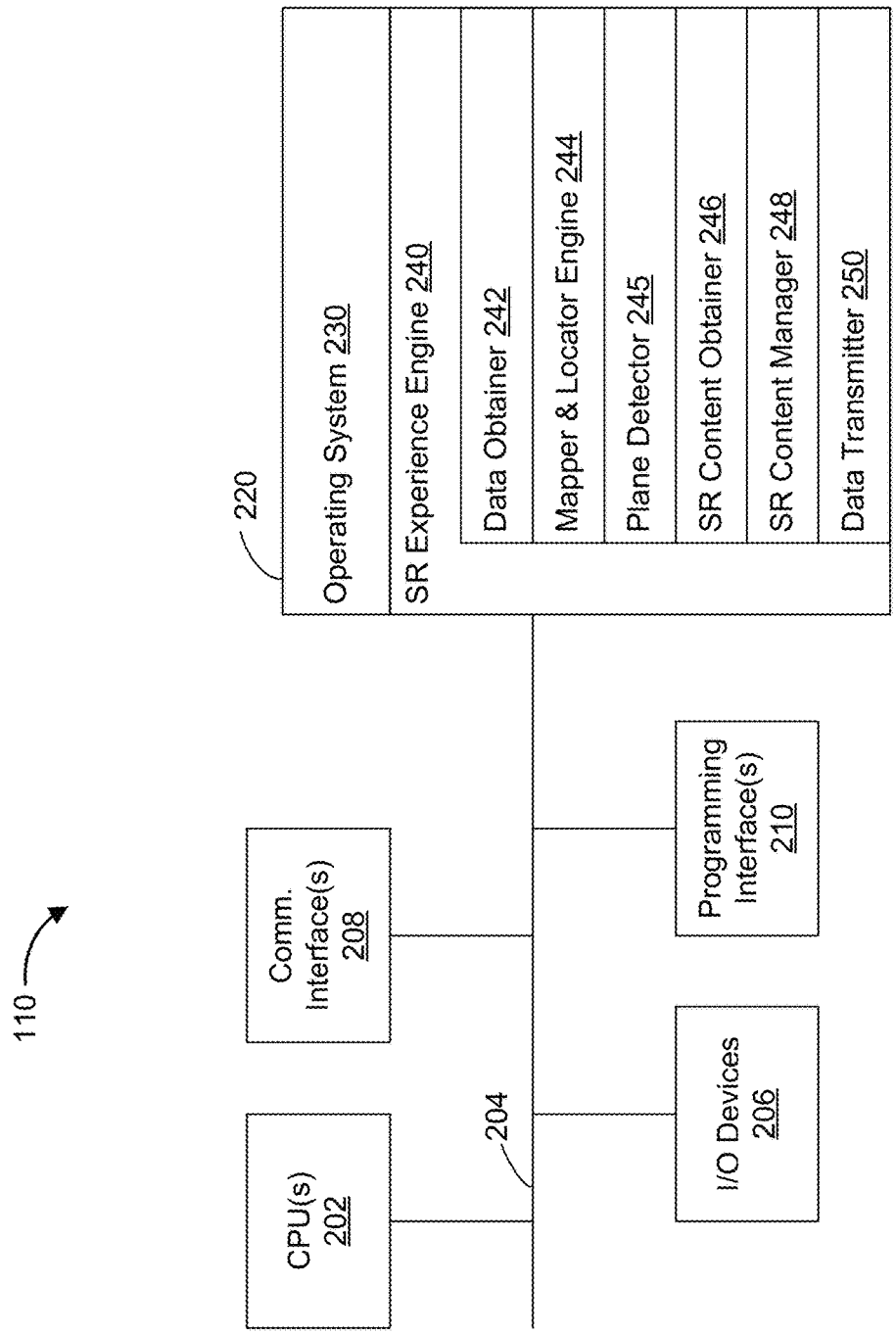
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a synthesized reality (SR) experience engine 240.

The operating system 230 includes procedures for handling various basic system services and for performing hardware dependent tasks. In some implementations, the SR experience engine 240 is configured to manage and coordinate one or more SR experiences for one or more users (e.g., a single SR experience for one or more users, or multiple SR experiences for respective groups of one or more users). To that end, in various implementations, the SR experience engine 240 includes a data obtainer 242, a mapper and locator engine 244, a plane detector 245, an SR content obtainer 246, an SR content manager 248, and a data transmitter 250.

In some implementations, the data obtainer 242 is configured to obtain data (e.g., presentation data, user interaction data, sensor data, location data, etc.) from at least one of sensors in the physical setting 105, sensors associated with the controller 110, the electronic device 120, and the display device 130. For example, the data obtainer 242 obtains sensor data from the electronic device 120 that includes image data from external facing image sensors of the electronic device 120, wherein the image data corresponds to images or a video stream capturing the physical setting 105. To that end, in various implementations, the data obtainer 242 includes instructions and/or logic therefor, and heuristics and metadata therefor.

In some implementations, the mapper and locator engine 244 is configured to map the physical setting 105 and to track the position/location of the electronic device 120 or the user 150 with respect to the physical setting 105. As such, in some implementations, the mapper and locator engine 244 is configured to synthesize a mesh map of the physical setting 105 based on locality data (e.g., sensor data characterizing the physical setting 105) from at least one of sensors in the physical setting 105, sensors associated with the controller 110, the electronic device 120, and the display device 130.

In some implementations, the mapper and locator engine 244 is also configured to determine the location and orientation of the electronic device 120 or the user 150 relative to one or more reference points (e.g., an object) in the physical setting (e.g., the center of mass of the object or another point) or the mesh map of the physical setting 105. According to some implementations, the mapper and locator engine 244 determines the orientation and location of the electronic device 120 based on one or more known localization techniques. For example, in some implementations, the mapper and locator engine 244 determines the orientation and location of the electronic device 120 relative to the object based on the techniques described in U.S. Provisional Patent Application No. 62/556,849, filed Sep. 11, 2017, which is incorporated herein in its entirety. To that end, in various implementations, the mapper and locator engine 244 includes instructions and/or logic therefor, and heuristics and metadata therefor.

In some implementations, the plane detector 245 is configured to detect planes (e.g., horizontal, vertical, or angled) within the mesh map. According to some implementations, the plane detector 245 detects the planes based on one or more known localization techniques. For example, in some implementations, the plane detector 245 detects the planes based on the techniques described in U.S. Provisional Patent Application No. 62/514,529, filed Jun. 2, 2017, which is incorporated herein in its entirety. In some implementations, the plane detector 245 is also configured filter planes that do not satisfy spatial criteria. To that end, in various implementations, the plane detector 245 includes instructions and/or logic therefor, and heuristics and metadata therefor.

In some implementations, the SR content obtainer 246 is configured to obtain (e.g., receive, retrieve, or generate) SR content. To that end, in various implementations, the SR content obtainer 246 includes instructions and/or logic therefor, and heuristics and metadata therefor.

In some implementations, the SR content manager 248 is configured to select SR content based on the mesh map and the plane detected within the mesh map. For example, the SR content manager 248 selects the SR content based on the user's location and orientation relative to the mesh map and/or the surface area of the planes detected within the mesh map. In some implementations, the SR content manager 248 is also configured to manage and coordinate the presentation of the SR content as the user's orientation and location changes relative to the physical setting or the user interacts with the SR content. To that end, in various implementations, the SR content manager 248 includes instructions and/or logic therefor, and heuristics and metadata therefor.

In some implementations, the data transmitter 250 is configured to transmit data (e.g., presentation data, location data, etc.) to at least one of the electronic device 120 and the display device 130. To that end, in various implementations, the data transmitter 250 includes instructions and/or logic therefor, and heuristics and metadata therefor.

Although the data obtainer 242, the mapper and locator engine 244, the plane detector 245, the SR content obtainer 246, the SR content manager 248, and the data transmitter 250 are shown as residing on a single device (e.g., the controller 110), it should be understood that in other implementations, any combination of the data obtainer 242, the mapper and locator engine 244, the plane detector 245, the SR content obtainer 246, the SR content manager 248, and the data transmitter 250 may be located in separate computing devices.

Moreover, FIG. 2 is intended more as a functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
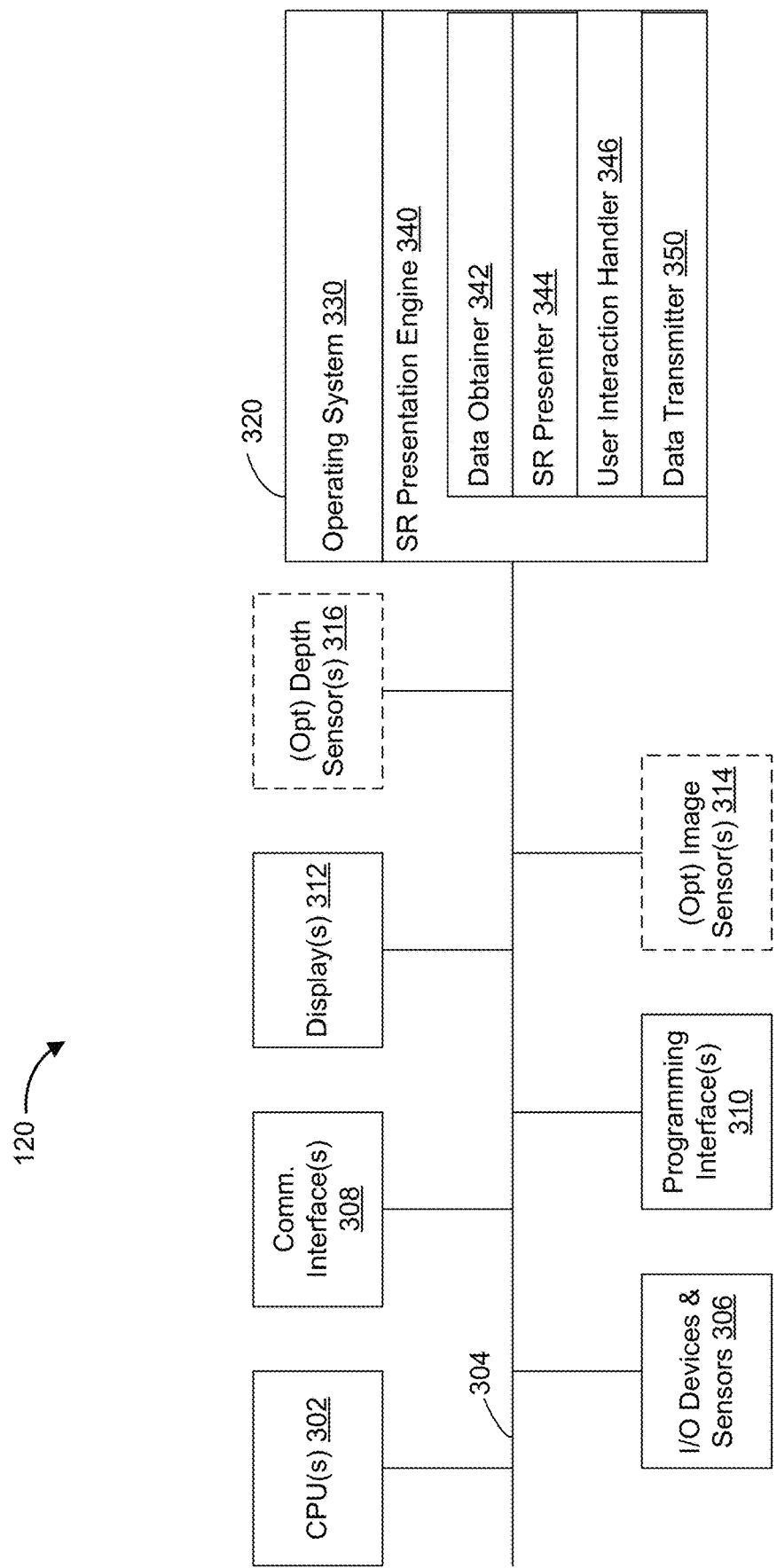
FIG. 3 is a block diagram of an example electronic device in accordance with some implementations.

FIG. 3 is a block diagram of an example of the electronic device 120 (e.g., an HMD, mobile phone, or tablet) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior and/or exterior facing image sensors 314, one or more optional depth sensors 316, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more displays 312 are configured to present the SR experience to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical setting 105). In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional image sensors 314 are configured to obtain image data that corresponds to at least a portion of the face of the user that includes the eyes of the user. For example, the one or more optional image sensors 314 correspond to one or more RGB cameras (e.g., with a complementary metal-oxide-semiconductor (CMOS) image sensor or a charge-coupled device (CCD) image sensor), infrared (IR) image sensors, event-based cameras, and/or the like.

In some implementations, the one or more optional depth sensors 316 are configured to obtain depth data that corresponds to at least a portion of the face of the user and to synthesize a depth/mesh map of the face of the user, where the mesh map characterizes the facial topography of the user. For example, the one or more optional depth sensors 316 correspond to a structured light device, a time-of-flight device, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an SR presentation engine 340.

The operating system 330 includes procedures for handling various basic system services and for performing hardware dependent tasks. In some implementations, the SR presentation engine 340 is configured to present SR content to the user via the one or more displays 312. To that end, in various implementations, the SR presentation engine 340 includes a data obtainer 342, an SR presenter 344, a user interaction handler 346, and a data transmitter 350.

In some implementations, the data obtainer 342 is configured to obtain data (e.g., presentation data, user interaction data, sensor data, location data, etc.) from at least one of sensors in the physical setting 105, sensors associated with the electronic device 120, the controller 110, and the display device 130. To that end, in various implementations, the data obtainer 342 includes instructions and/or logic therefor, and heuristics and metadata therefor.

In some implementations, the SR presenter 344 is configured to present SR content via the one or more displays 312. In some implementations, the SR presenter 344 is also configured to present flat video content via the one or more displays 312. To that end, in various implementations, the SR presenter 344 includes instructions and/or logic therefor, and heuristics and metadata therefor.

In some implementations, the user interaction handler 346 is configured to detect and interpret user interactions with the presented SR content. To that end, in various implementations, the user interaction handler 346 includes instructions and/or logic therefor, and heuristics and metadata therefor.

In some implementations, the data transmitter 350 is configured to transmit data (e.g., presentation data, location data, user interaction data, etc.) to at least one of the controller 110 and the display device 130. To that end, in various implementations, the data transmitter 350 includes instructions and/or logic therefor, and heuristics and metadata therefor.

Although the data obtainer 342, the optional orientation determiner 343, the SR presenter 344, the user interaction handler 346, and the data transmitter 350 are shown as residing on a single device (e.g., the electronic device 120), it should be understood that in other implementations, any combination of the data obtainer 342, the optional orientation determiner 343, the SR presenter 344, the user interaction handler 346, and the data transmitter 350 may be located in separate computing devices.

Moreover, FIG. 3 is intended more as a functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
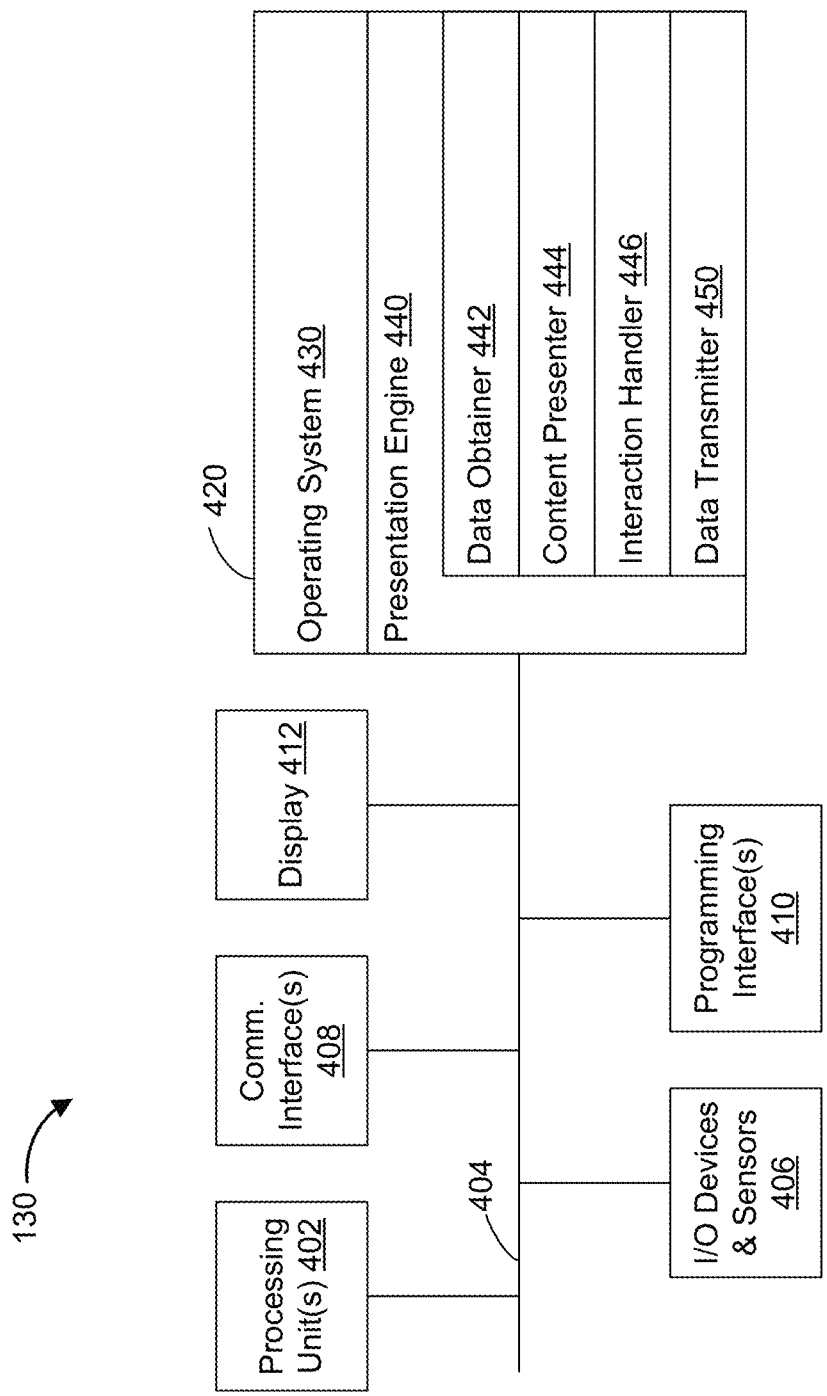
FIG. 4 is a block diagram of an example optional display device in accordance with some implementations.

FIG. 4 is a block diagram of an example of the optional display device 130 (e.g., a television (TV) or other display within the physical setting 105) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the display device 130 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 410, a display 412, a memory 420, and one or more communication buses 404 for interconnecting these and various other components. In some implementations, the display device 130 is optionally controlled by a remote-control device, voice commands, the electronic device 120, or the like.

In some implementations, the one or more communication buses 404 include circuitry that interconnects and controls communications between system components. In some implementations, the one or more I/O devices and sensors 406 include at least one of one or more IR sensors, one or more physical buttons, one or more microphones, one or more speakers, one or more image sensors, one or more depth sensors, and/or the like.

In some implementations, the display 412 corresponds to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a presentation engine 440.

The operating system 430 includes procedures for handling various basic system services and for performing hardware dependent tasks. In some implementations, the presentation engine 440 is configured to present media content (e.g., video and/or audio content) to users via the display 412 and the one or more I/O devices and sensors 406 (e.g., one or more speakers). To that end, in various implementations, the presentation engine 440 includes a data obtainer 442, a content presenter 444, an interaction handler 446, and a data transmitter 450.

In some implementations, the data obtainer 442 is configured to obtain data (e.g., presentation data, user interaction data, etc.) from at least one of sensors in the physical setting 105, sensors associated with the display device 130, the controller 110, and the electronic device 120. To that end, in various implementations, the data obtainer 442 includes instructions and/or logic therefor, and heuristics and metadata therefor.

In some implementations, the content presenter 444 is configured to render and/display video content via the display 412. To that end, in various implementations, the content presenter 444 includes instructions and/or logic therefor, and heuristics and metadata therefor.

In some implementations, the interaction handler 446 is configured to detect and interpret user interactions with the display device 130 (e.g., navigation, playback, tuning, volume adjustment, or the like commands). To that end, in various implementations, the interaction handler 446 includes instructions and/or logic therefor, and heuristics and metadata therefor.

In some implementations, the data transmitter 450 is configured to transmit data (e.g., presentation data, user interaction data, etc.) to at least one of the controller 110 and the electronic device 120. To that end, in various implementations, the data transmitter 450 includes instructions and/or logic therefor, and heuristics and metadata therefor.

Although the data obtainer 442, the content presenter 444, the interaction handler 446, and the data transmitter 450 are shown as residing on a single device (e.g., the display device 130), it should be understood that in other implementations, any combination of the data obtainer 442, the content presenter 444, the interaction handler 446, and the data transmitter 450 may be located in separate computing devices.

Moreover, FIG. 4 is intended more as a functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 5:
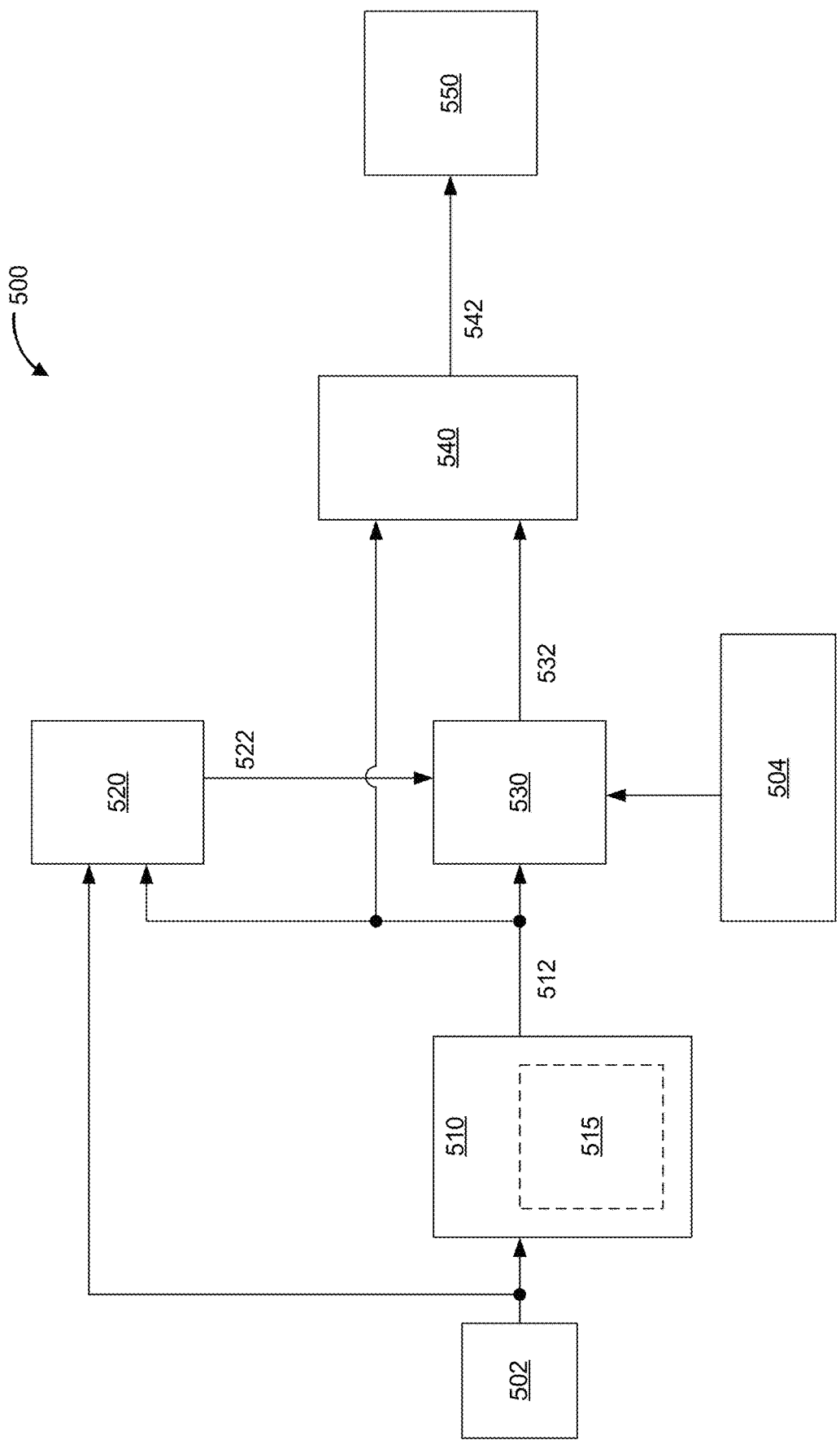
FIG. 5 is a block diagram of an example synthesized reality (SR) content presentation architecture in accordance with some implementations.

FIG. 5 illustrates an example SR content presentation architecture 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the SR content presentation architecture 500 synthesizes a mesh map of the physical setting surrounding a user, selects SR content based on the mesh map, and generates composite SR content tailored to the physical setting by compositing at least a portion of the SR content with the mesh map. As such, the electronic device 120 overlays SR content on or "skins" at least a portion of the physical setting 105 with SR content (e.g., an at-home holodeck).

As shown in FIG. 5, in some implementations, the mapping engine 510 (e.g., a portion of the mapper and locator engine 244 in FIG. 2) obtains locality data 502 from one or more sensors associated with the physical setting 105, the controller 110, electronic device 120, and/or the display device 130. In some implementations, the locality data 502 characterizes objects and relative spatial information of a volumetric region around a user 150 (e.g., an X cm radius centered on the user 150 of the electronic device 120).

In some implementations, the locality data 502 corresponds to sensor data, such as image data, that enables recognition of humanoids, androids, animals, and/or objects within the physical setting. In some implementations, the locality data 502 corresponds to sensor data, such as image data, GPS data, beacon data, IR data, ultrasonic data, LiDAR data, depth data, and/or the like that enables mapping of the physical setting and localization of humanoids, androids, animals, and/or objects within the physical setting.

For example, the locality data 502 corresponds to image data from one or more external-facing image sensors of the electronic device 120 (e.g., images or a live video stream of the physical setting 105 from the perspective of the user 150). For example, the locality data 502 corresponds to image data from one or more image sensors within the physical setting 105. In this example, the image sensors within the physical setting may correspond to fixed video cameras (e.g., wall-mounted cameras) or movable devices with attached video cameras (e.g., drones or the like).

As shown in FIG. 5, in some implementations, the mapping engine 510 synthesizes a mesh map 512 of the physical setting 105 or a portion thereof (e.g., the volumetric region surrounding the user 150) based on the locality data 502. In some implementations, the plane detector 515 (e.g., the plane detector 245 in FIG. 2) detects one or more planes within the mesh map 512 and filters planes that do not satisfy spatial criteria. As shown in FIG. 5, in some implementations, the locator engine 520 (e.g., a portion of the mapper and locator engine 244 in FIG. 2) determines the user location 522 for the user 150 relative to the physical setting 105 based on the locality data 502 and the mesh map 512.

As shown in FIG. 5, in some implementations, the SR content selector engine 530 (e.g., a portion of the SR content manager 248 in FIG. 2) selects SR content 532 that satisfies a dimensional variance threshold relative to one or more portions of the mesh map 512 (e.g., the planes that satisfy the spatial criteria) from the SR content repository 504. For example, the SR content selector engine 530 selects the SR content 532 that fits the planes that satisfy the spatial criteria. In other words, the SR content selector engine 530 selects the SR content 532 that fits the physical setting 105 in order to tailor the SR experience to the physical setting 105.

As shown in FIG. 5, in some implementations, the composite engine 540 (e.g., a portion of the SR content manager 248 in FIG. 2) generates composite SR content 542 by compositing at least a portion of the SR content 532 with the mesh map 512. In some implementations, the composite engine 540 adapts (e.g., stretches, shrinks, or enlarges) the selected SR content to fit the one or more portions of the mesh map 512 (e.g., the planes that satisfy the spatial criteria).

In some implementations, the composite SR content 542 is provided to the SR presentation pipeline 550 for presentation to the user 150. In some implementations, the composite SR content 542 is rendered by the controller 110 and transmitted to the electronic device 120 as presentation data, where the composite SR content 542 is presented via the one or more displays 312.

Figure 6A:
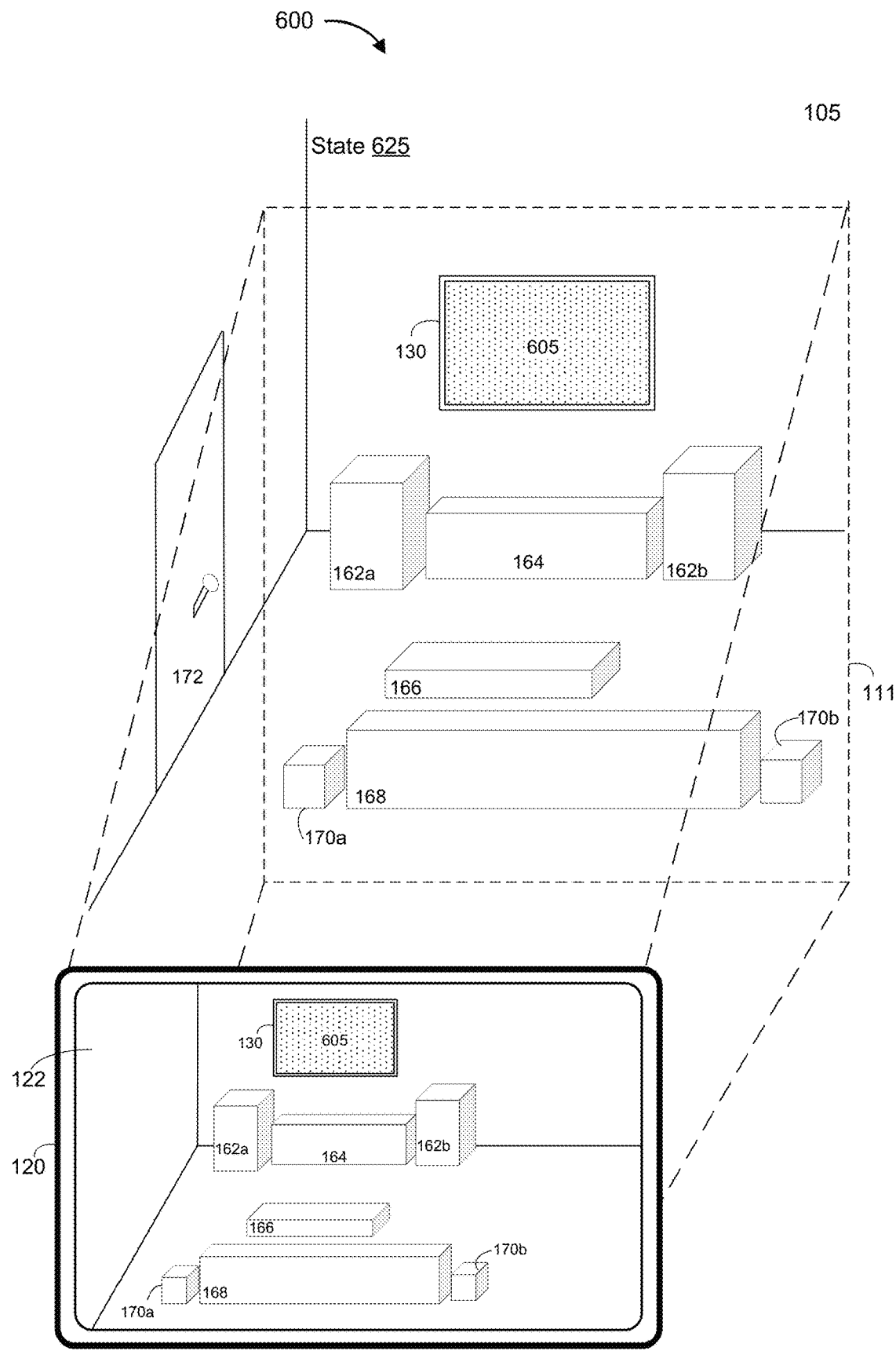
FIGS. 6A-6C illustrate an example SR presentation scenario in accordance with some implementations.
Figure 6B:
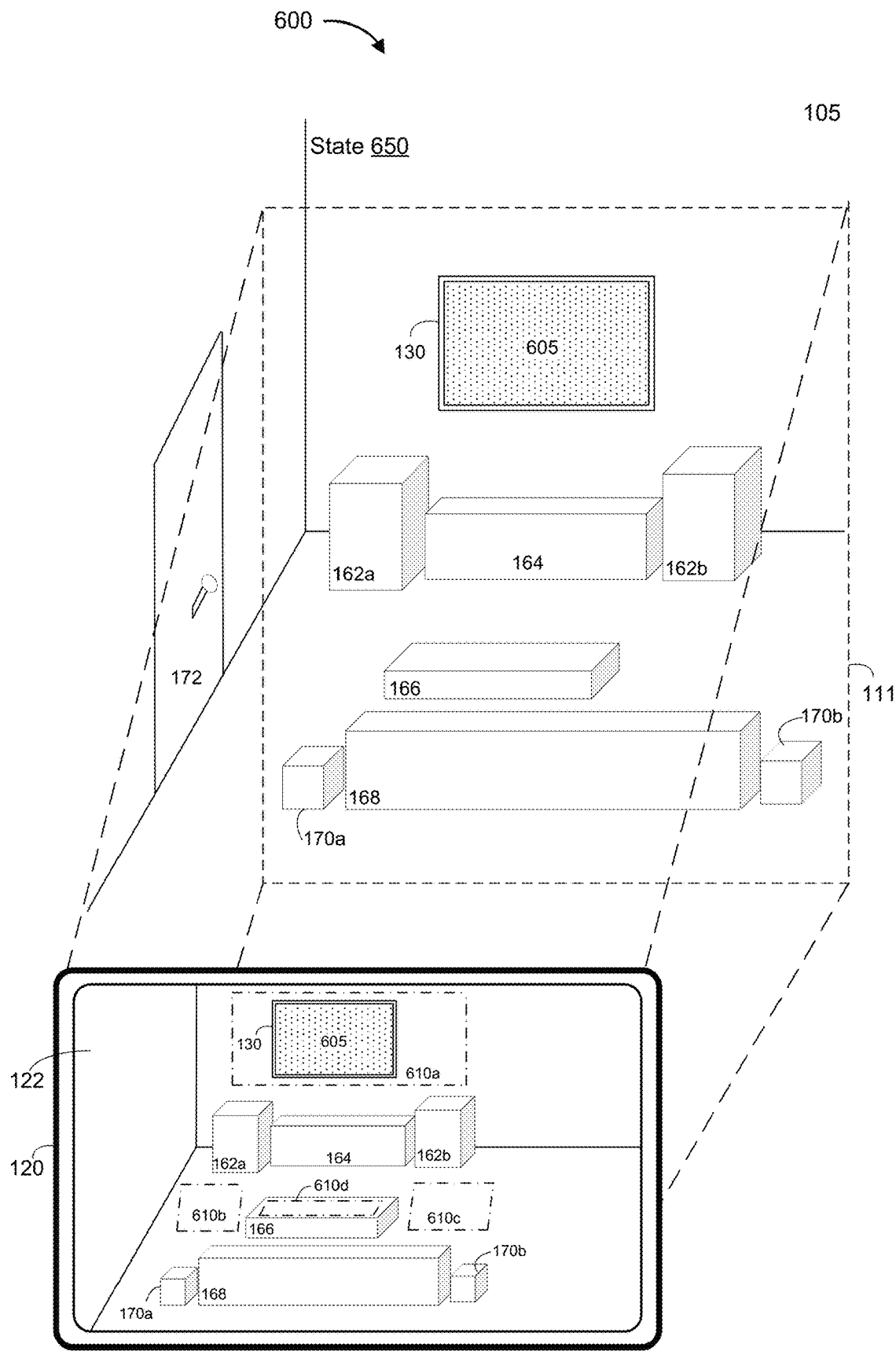
Figure 6C:
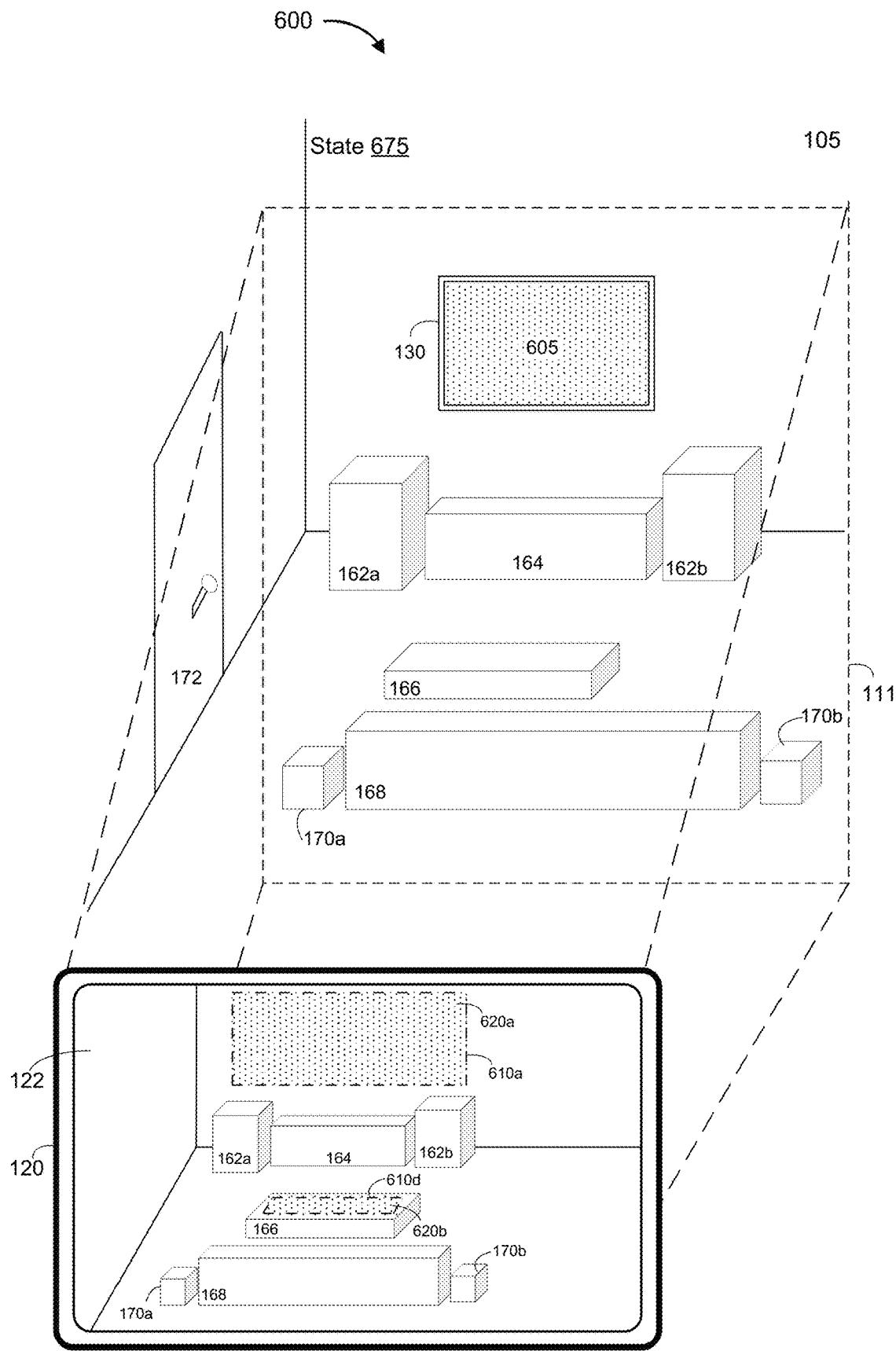

FIGS. 6A-6C illustrate an example SR presentation scenario 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 6A, the physical setting 105 includes the chairs 162a and 162b, credenza 164, coffee table 166, sofa 168, end tables 170a and 170b, and door 172. As shown in FIG. 6A, the user is standing behind the sofa 168 facing the display device 130 while the chairs 162a and 162b, credenza 164, coffee table 166, sofa 168, and end tables 170a and 170b are within the field-of-view 111 of the electronic device 120. For example, the electronic device 120 corresponds to AR-enabled tablet or mobile phone with video pass-through of the physical setting 105 displayed on the display 122.

As shown in FIG. 6A, in state 625 (e.g., at time 7), the user is watching video content 605 (e.g., a television (TV) episode or movie) on the display device 130. For example, the electronic device 120 or the display device 130 displays a subtle (e.g., non-obtrusive) affordance or notification indicating that an SR experience associated with the video content 605 is available. Continuing with this example, the electronic device 120 detects a command issued by user to enter an SR experience associated with the video content 605 (e.g., a voice command, gestural command, or the like). In response to detecting the command, for example, the electronic device 120 synthesizes a mesh map of the physical setting 105 and detects planes within the mesh map.

As shown in FIG. 6B, in state 650 (e.g., at time T+1), the electronic device 120 identifies planes 610a, 610b, 610c, and 610d within the physical setting 105. According to some implementations, the electronic device 120 filters planes that do not satisfy spatial criteria. For example, the planes 610b and 610c do not satisfy a line-of-sight criterion associated with the spatial criteria (e.g., more than Z degrees from the focal point of the user 150). In other words, the location of the places 610b and 610c is too low relative to the focal point of the user 150. As such, planes 610a and 610d satisfy the spatial criteria.

As shown in FIG. 6C, in state 675 (e.g., at time T+2), the electronic device 120 presents, on the display 122, SR content 620a (e.g., background scenery associated with the video content 605) on the plane 610a and the SR content 620b (e.g., peripheral scenery associated with the video content 605) on the plane 610d. In some implementations, the SR content 620a and 620b is planar or volumetric. According to some implementations, the electronic device 120 selects SR content associated with the video content 605 for the detected planes that meet the spatial criteria based on the detected planes and the orientation/location of the user relative to the mesh map.

As one example, the video content 605 corresponds to a court room scene within a movie. In this example, the SR content 620a and 620b correspond to an SR reconstruction of at least a portion of the court room scene. Continuing with this example, the SR content 620a corresponds to the judge's bench and the SR content 620b corresponds to opposing lawyers and their teams. As such, continuing with the example, the electronic device 120 skins at least a portion of the physical setting 105 with the SR content 620a and 620b associated with the video content 605 such that the user is able to experience the court room scene within the movie as if it is occurring within his/her living room.

Figure 7A:
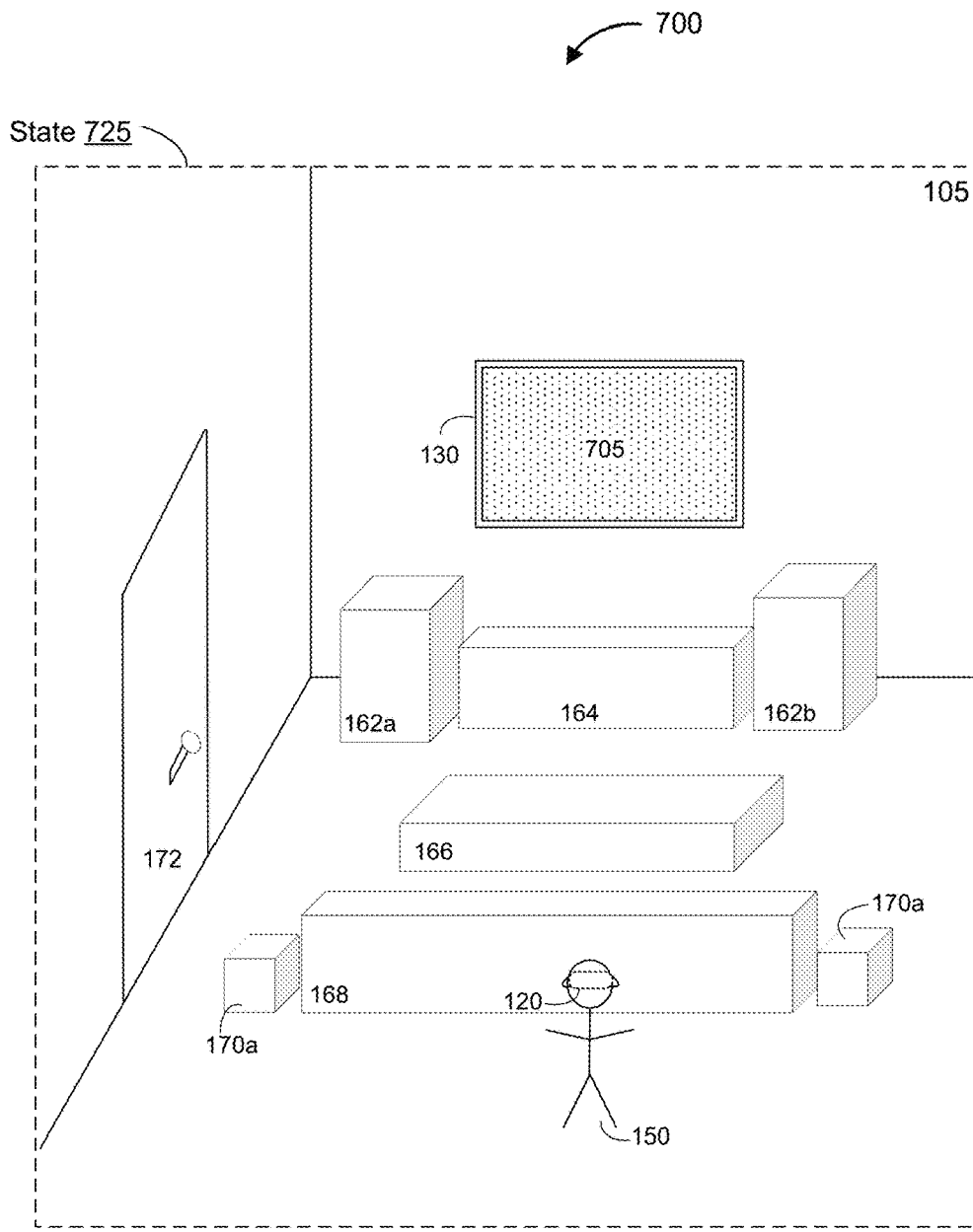
FIGS. 7A-7C illustrate another example SR presentation scenario in accordance with some implementations.
Figure 7B:
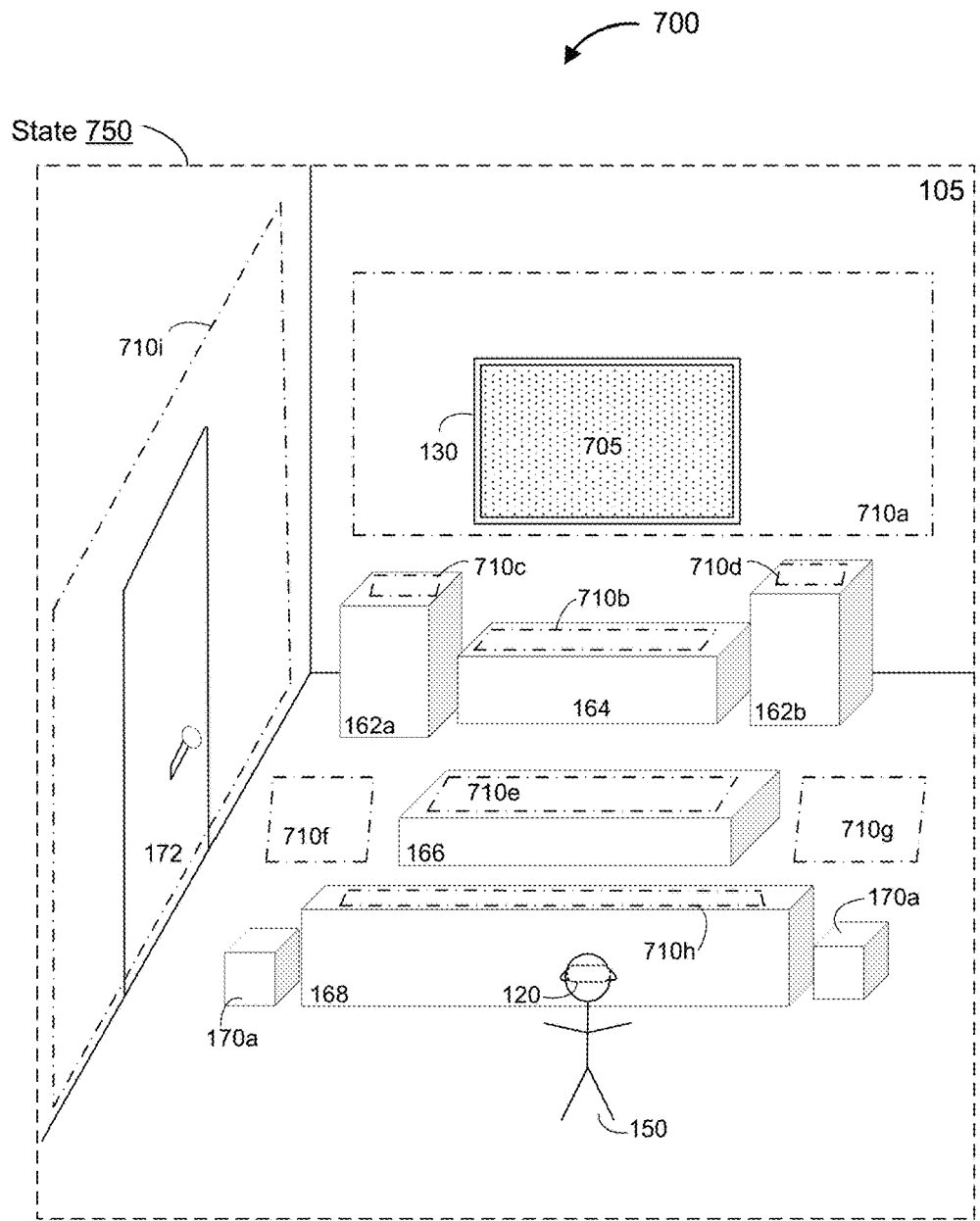
Figure 7C:
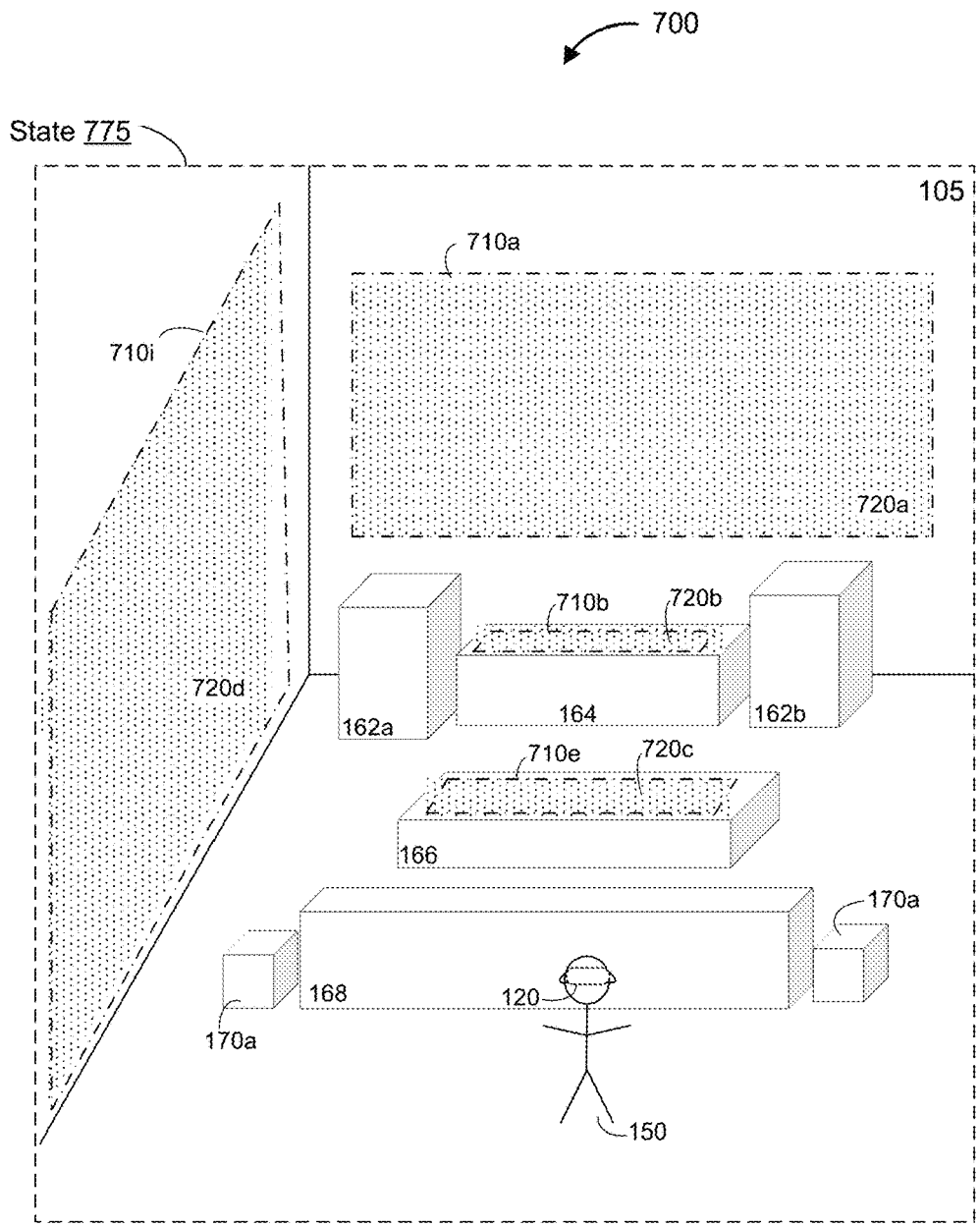

FIGS. 7A-7C illustrate an example SR presentation scenario 700 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 7A, the physical setting 105 includes the chairs 162a and 162b, credenza 164, coffee table 166, sofa 168, end tables 170a and 170b, and door 172. As shown in FIG. 7A, the user 150 is standing behind the sofa 168 facing the display device 130 while wearing the electronic device 120 on his/her head. For example, the electronic device 120 corresponds to AR-enabled HMD (e.g., glasses, goggles, or the like) with optical see-through of the physical setting 105.

As shown in FIG. 7A, in state 725 (e.g., at time 7), the user 150 is watching video content 705 (e.g., a television (TV) episode or movie) on the display device 130. For example, the electronic device 120 or the display device 130 displays a subtle (e.g., non-obtrusive) affordance or notification indicating that an SR experience associated with the video content 705 is available. Continuing with this example, the controller 110 and/or the electronic device 120 detects a command issued by user 150 to enter an SR experience associated with the video content 705 (e.g., a voice command, gestural command, or the like). In response to detecting the command, for example, the controller 110 synthesizes a mesh map of the physical setting 105 and detects planes within the mesh map.

As shown in FIG. 7B, in state 750 (e.g., at time T+1), the controller 110 identifies planes 710a, 710b, 710c, 710d, 710e, 710f, 710g, 710h, and 710i within the physical setting. According to some implementations, the controller 110 filters planes that do not satisfy spatial criteria. For example, the planes 710c and 710d associated with the chairs 162a and 162b, respectively, do not satisfy a dimensional criterion associated with the spatial criteria (e.g., less than M×N cm or Y cm$^2$). In other words, the surface area of the planes 710c and 710d is too small for the placement of SR content. For example, the planes 710f and 710g do not satisfy a line-of-sight criterion associated with the spatial criteria (e.g., more than Z degrees from the focal point of the user 150). In other words, the location of the places 710f and 710g is too low relative to the focal point of the user 150. For example, the plane 710h does not satisfy a personal radius criterion associated with the spatial criteria (e.g., less than Q cm from the user 150). In other words, the plane 710h is too close to the user 150. As such, planes 710a, 710b, 710e, and 710i satisfy the spatial criteria.

As shown in FIG. 7C, in state 775 (e.g., at time T+2), the electronic device 120 presents SR content 720a (e.g., background scenery associated with the video content 705) on the plane 710a, SR content 720b on the plane 710b (e.g., background characters and/or objects associated with the video content 705), SR content 720c (e.g., foreground characters and/or objects associated with the video content 705) on the plane 710e, and the SR content 720d (e.g., peripheral scenery associated with the video content 705) on the plane 710i. In some implementations, the SR content 720a, 720b, 720c, and 720d is planar or volumetric. According to some implementations, the controller 110 selects SR content associated with the video content 705 for the detected planes that meet the spatial criteria based on the detected planes and the orientation/location of the user 150 relative to the mesh map.

As one example, the video content 705 corresponds to a boxing match scene within a movie. In this example, the SR content 720*a*, 720*b*, 720*c*, and 720*d* correspond to an SR reconstruction of at least a portion of the boxing match scene. Continuing with this example, the SR content 720*a* corresponds to the crowd in the background, the SR content 720*b* corresponds to the referee and the ropes and turnbuckles of the boxing ring, the 7R content 620*c* corresponds to the fighters sparring within the boxing ring, and the SR content 720*d* corresponds to the crowd in the background in the periphery. As such, continuing with the example, the electronic device 120 skins at least a portion of the physical setting 105 with the SR content 720*a*, 720*b*, 720*c*, and 720*d* associated with the video content 705 such that the user 150 is able to experience the boxing match scene within the movie as if it is occurring within his/her living room.

Figure 8:
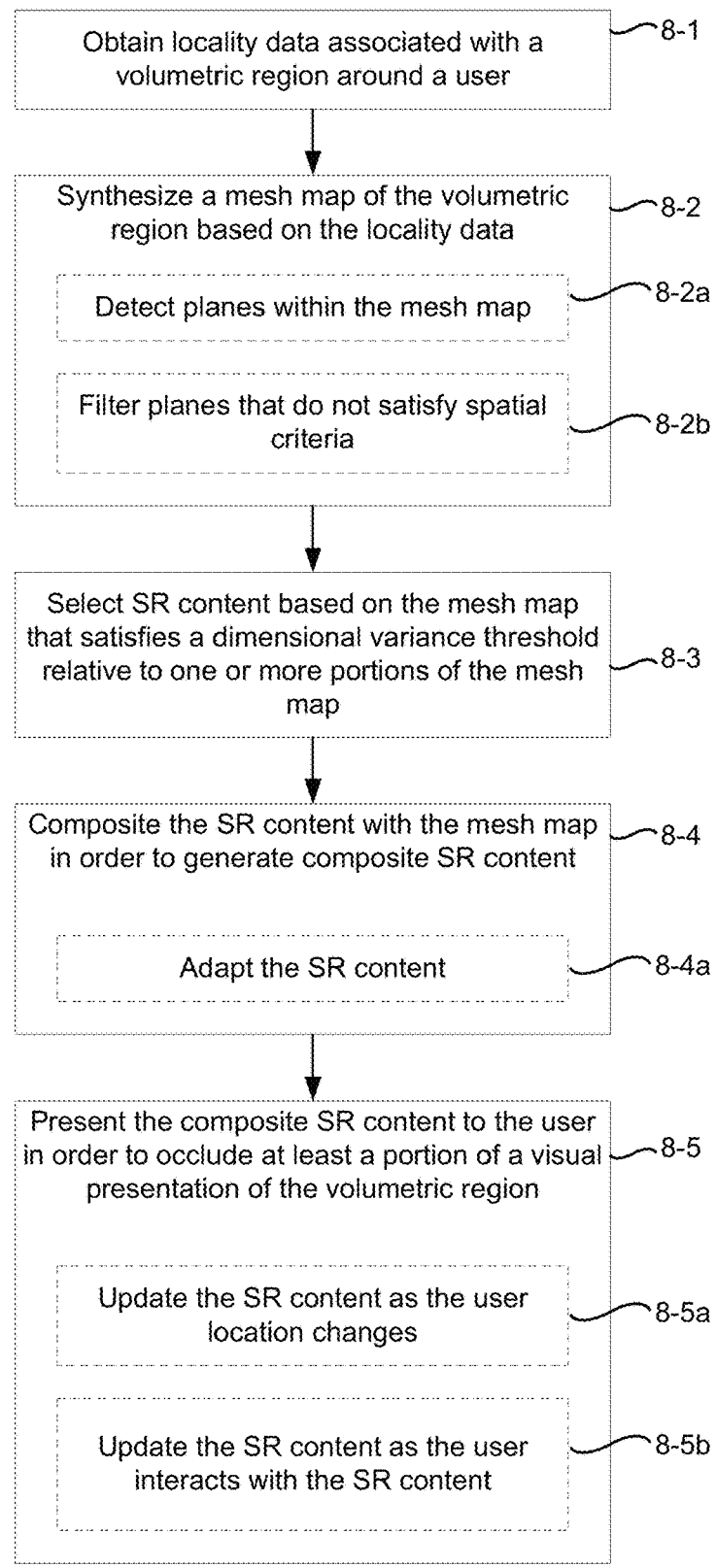
FIG. 8 is a flowchart representation of a method of tailoring an SR experience to a physical setting in accordance with some implementations.

FIG. 8 is a flowchart representation of a method 800 of tailoring an SR experience to a physical setting in accordance with some implementations. In various implementations, the method 800 is performed by a device with non-transitory memory and one or more processors coupled with the non-transitory memory (e.g., the controller 110 in FIGS. 1B and 2, the electronic device 120 in FIGS. 1A-1B and 3, or a suitable combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory). Briefly, in some circumstances, the method 800 includes: obtaining locality data associated with a volumetric region around a user; synthesizing a mesh map of the volumetric region based on the locality data; selecting SR content based on the mesh map that satisfies a dimensional variance threshold relative to one or more portions of the mesh map; compositing at least a portion of the SR content with the mesh map in order to generate composite SR content; and presenting the composite SR content to the user in order to occlude at least a portion of a visual presentation of the volumetric region.

As represented by block 8-1, the method 800 includes obtaining (e.g., collecting, receiving, or retrieving) locality data associated with a volumetric region around a user. In some implementations, the locality data characterizes objects and relative spatial information for the volumetric region. For example, the volumetric region corresponds to a volumetric region with an X cm radius centered on the user 150 of the electronic device 120.

In some implementations, the controller 110 and/or the electronic device 120, or a component thereof (e.g., the data obtainer 242 in FIG. 2) obtains the locality data from at least one of sensors in the physical setting 105, sensors associated with the controller 110, the electronic device 120, and the display device 130. For example, the locality data corresponds to image data from one or more external-facing image sensors of the electronic device 120 (e.g., images or a live video stream of the physical setting 105 from the perspective of the user 150. In another example, the locality data corresponds to image data from one or more image sensors within the physical setting 105. In this example, the image sensors within the physical setting may correspond to fixed video cameras (e.g., wall-mounted cameras) or movable devices with attached video cameras (e.g., drones or the like). In another example, the locality data corresponds to other sensor data associated with physical setting and/or the user 150 from GPS, LiDAR, IR sensors, depth sensors, ultrasonic sensors, and/or the like.

As represented by block 8-2, the method 800 includes synthesizing a mesh map of the volumetric region based on the locality data. In some implementations, the controller 110 and/or the electronic device 120, or a component thereof (e.g., the mapper and locator engine 244) synthesizes a mesh map of the physical setting 105 or a portion thereof (e.g., the volumetric region surrounding the user 150) based on the locality data. For example, the mesh map defines the dimensions of the volumetric region and objects within the volumetric region such as furniture, walls, other users, and/or the like.

In some implementations, synthesizing the mesh map includes blocking off restricted areas for safety (e.g., balconies). For example, SR content cannot be presented in these restricted areas allowing for the user to see the potential hazard by way of optical see-through via an AR-enabled HMD.

In some implementations, as represented by block 8-2*a*, the method 800 includes detecting planes within the mesh map. In some implementations, the controller 110 and/or the electronic device 120, or a component thereof (e.g., the plane detector 245) identifies planes (e.g., horizontal, vertical, or angled) within the mesh map. According to some implementations, the plane detector 245 detects the planes based on one or more known localization techniques. For example, in some implementations, the plane detector 245 detects the planes based on the techniques described in U.S. Provisional Patent Application No. 62/514,529, filed Jun. 2, 2017, which is incorporated herein in its entirety. With reference to FIG. 6B, for example, the electronic device 120 identifies planes 610*a*, 610*b*, 610*c*, and 610*d* within the physical setting 105. With reference to FIG. 7B, for example, the controller 110 and/or the electronic device 120 identifies planes 710*a*, 710*b*, 710*c*, 710*d*, 710*e*, 710*f*, 710*f*, 710*h*, and 710*i* within the physical setting.

In some implementations, as represented by block 8-2*b*, the method 800 includes filtering planes that do not satisfy spatial criteria. In some implementations, the controller 110 and/or the electronic device 120, or a component thereof (e.g., the plane detector 245) filters planes that do not satisfy spatial criteria. With reference to FIG. 7B, for example, the controller 110 and/or the electronic device 120 filters the planes 710*c* and 710*d* for failing to satisfy a dimensional criterion associated with the spatial criteria (e.g., less than M×N cm or Y cm$^2$). With reference to FIG. 7B, for example, the controller 110 and/or the electronic device 120 filters the planes 710*f* and 710*g* for failing to satisfy a line-of-sight criterion associated with the spatial criteria (e.g., more than Z degrees from the focal point of the user 150). With reference to FIG. 7B, for example, the controller 110 and/or the electronic device 120 filters the plane 710*h* does for failing to satisfy a personal radius criterion associated with the spatial criteria (e.g., less than Q cm from the user 150). As such, with reference to FIG. 7B, for example, the controller 110 and/or the electronic device 120 determines that the planes 710*a*, 710*b*, 710*e*, and 710*i* satisfy the spatial criteria.

As represented by block 8-3, the method 800 includes selecting SR content based on the mesh map that satisfies a dimensional variance threshold relative to one or more portions of the mesh map. In some implementations, the SR content satisfies a dimensional variance threshold relative to one or more portions of the mesh map. In some implementations, the controller 110 and/or the electronic device 120, or a component thereof (e.g., the SR content manager 248 in FIG. 2) selects SR content that satisfies a dimensional variance threshold relative to one or more portions of the mesh map 512 (e.g., SR content that fits the surface area of the planes that satisfy the spatial criteria). In other words, the controller 110 and/or the electronic device 120 selects the SR content that fits the physical setting 105 in order to tailor the SR experience to the physical setting 105.

For example, the controller 110 and/or the electronic device 120 selects first SR content to be presented on or about a couch, second SR content to be presented on or about a mirror, and third SR content to be presented on or about a wall within the same physical setting. For example, the controller 110 and/or the electronic device 120 selects different SR content based on open floor space, table surface size, open wall space, couch size and occupation, and/or the like. In some implementations, the selected SR content corresponds to SR reconstructed portions of video content currently being viewed by a user (e.g., characters or scenery from a movie). In some implementations, the selected SR content corresponds to SR content that augments video content currently being viewed by a user (e.g., maps, graphs, educational information, or the like associated with a movie).

In some implementations, selecting the SR content includes first matching selecting portions of the current plot scene within video content that fit onto one or more portions of the mesh map (e.g., the planes that satisfy the spatial criteria) based on the user's current point-of-view relative to the mesh map. For example, if a couch is behind the user but a coffee table is in front of the user, the controller 110 and/or the electronic device 120 selects SR content that fits the dimensions of the coffee table and forgoes selecting SR content that fits the dimension of the couch due to its position behind the user.

In some implementations, the controller 110 and/or the electronic device 120, or a component thereof (e.g., the SR content obtainer 246) obtains (e.g., receives, retrieves, or generates) the SR content. In some implementations, the SR content is obtained from a local library or a remote library (e.g., a remote server, a third-party content provider, or the like). In some implementations, the SR content corresponds associated with video content currently being viewed such as space fighters for a space battle, bystanders for a plot setting in a crowded plaza, automobiles for a plot setting in a traffic jam, or the like. In some implementations, the SR content is an SR reconstruction of a scene in video content currently being viewed. For example, in some implementations, the SR reconstruction of the video content is generated based on the techniques described in U.S. Provisional Patent Application No. 62/620,334, filed Jan. 22, 2018, which is incorporated herein in its entirety.

As represented by block 8-4, the method 800 includes compositing at least a portion of the SR content with the mesh map in order to generate composite SR content. In some implementations, the controller 110 and/or the electronic device 120, or a component thereof (e.g., the SR content manager 248 in FIG. 2) composites at least a portion of the SR content with the mesh map in order to generate composite SR content. In some implementations, generating the composite SR content includes skinning a portion of the user's physical setting with the selected SR content of a scene to the user's room. As one example, the controller 110 and/or the electronic device 120 skins the user's living room with the bridge of a large space cruiser or a shuttle cockpit based on the size of the living room and the furniture within the living room.

In some implementations, as represented by block 8-4$a$, the method 800 includes adapting the SR content. In some implementations, the controller 110 and/or the electronic device 120, or a component thereof (e.g., the SR content manager 248 in FIG. 2) adapts (e.g., stretches, shrinks, or enlarges) the selected SR content to fit the one or more portions of the mesh map (e.g., the planes that satisfy the spatial criteria). In some implementations, the SR content is adapted to fit the mesh map or the planes detected within the volumetric region that satisfy the spatial criteria. (e.g., stretch or shrink the SR content based on the available surface area of the table or the unobstructed open floor space). In some implementations, the amount to which the SR content may be adapted is limited by adaptation constraint criteria (e.g., associated with IP policy right constraints, DRM limitations, or distortion limits).

As represented by block 8-5, the method 800 includes presenting the composite SR content to the user in order to occlude at least a portion of a visual presentation of the volumetric region. In some implementations, the SR content is rendered by the controller 110 and transmitted by the controller 110 to the SR device where the SR content is presented to the user via the one or more displays 312. In some implementations, the electronic device 120 or a component thereof (e.g., the SR presenter 344 in FIG. 3) presents the SR content via the one or more displays 312. For example, the SR content is overlaid, superimposed, or projected on portions of the physical setting that are in turn occluded by the SR content.

As one example, in FIG. 6C, the electronic device 120 presents, on the display 122, SR content 620$a$ and 620$b$ associated with the video content 605. As another example, in FIG. 7C, the electronic device 120 presents SR content 720$a$, 720$b$, 720$c$, and 720$d$ associated with the video content 705, where the SR content 720$a$ occludes the display device 130 shown in FIGS. 7A-7B and the SR content 720$d$ occludes the door 172 shown in FIGS. 7A-7B. In some implementations, the SR content is volumetric. For example, the SR content is presented on top of the user's coffee table but not on the user's couch or windows.

In some implementations, the SR experience includes a transition from the user viewing video content on display device 130 (e.g., a TV or tablet) to an SR content associated with the video content presented via an HMD. As one example, in FIG. 7A, in state 725, the display device 130 displays video content 705 to the user. Continuing with this example, in FIG. 7C, in state 775, the electronic device 120 presents SR content 720$a$, 720$b$, 720$c$, and 720$d$ associated with the video content 705. In some implementations, the video content 705 is paused in state 775. In some implementations, the video content 705 continues concurrently in state 775.

In some implementations, as represented by block 8-5$a$, the method 800 includes updating the SR content as the user location changes. In some implementations, the controller 110 and/or the electronic device 120, or a component thereof (e.g., the SR content manager 248 in FIG. 2) updates (e.g., replaces, modifies, etc.) the SR content as the user location changes relative to the mesh map. For example, the SR content is updated as the user 150 moves about the physical setting 105. According to some implementations, the SR content is volumetric so user can select from almost an infinite set of camera angles by moving about the physical setting. In some implementations, the SR content is updated as the mesh map changes (e.g., a chair or other furniture is moved about the space).

In some implementations, as represented by block 8-5*b*, the method 800 includes updating the SR content as the user interacts with the SR content. In some implementations, the controller 110 and/or the electronic device 120, or a component thereof (e.g., the SR content manager 248 in FIG. 2) updates (e.g., replaces, modifies, etc.) the SR content as the user interacts with the SR content. For example, the SR content is interactive such that the SR changes as the user modifies or otherwise interacts with the SR content. In some implementations, as the user interacts with the SR content, the electronic device 120 provides audio, haptic, skin shear, temperature, or the like feedback.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a computing system including non-transitory memory and one or more processors, wherein the computing system is communicatively coupled to a display device and one or more input devices:
   detecting a user input associated with presenting a synthesized reality (SR) experience; and
   in response to detecting the user input:
      obtaining a mesh map for a volumetric region and obtaining SR content with a first set of dimensions;
      adapting the SR content by modifying one or more dimensions of the SR content from the first set of dimensions to a second set of dimensions based on one or more portions of the mesh map; and
      causing presentation of the adapted SR content with the second set of dimensions via the display device.

2. The method of claim 1, wherein the user input is detected while presenting video content that corresponds to the SR experience.

3. The method of claim 2, further comprising:
while presenting the video content and prior to detecting the user input, presenting, via the display device, a notification indicating that the SR experience associated with the video content is available for playback in response to selection of an associated affordance; and
wherein the user input corresponds to selection of the associated affordance.

4. The method of claim 2, wherein the video content is presented via the display device of the computing system.

5. The method of claim 2, wherein the video content is presented via a second device different from the computing system, wherein the second device is communicatively coupled with the computing system.

6. The method of claim 1, wherein the user input corresponds to one of a voice command or a gestural command detected via the one or more input devices of the computing system.

7. The method of claim 1, further comprising:
adjusting the adapted SR content based on and in response to detecting a change to an orientation of the computing system relative to the SR content.

8. The method of claim 1, further comprising:
adjusting the adapted SR content based on and in response to detecting one or more user interactions with the SR content via the one or more input devices.

9. The method of claim 1, further comprising:
detecting a set of planes within the mesh map, wherein the one or more portions of the mesh map correspond to the set of planes; and
filtering out planes from the set of planes that do not satisfy a spatial criterion, wherein the spatial criterion is satisfied when a plane corresponds to at least a threshold surface area.

10. A device comprising:
one or more processors;
a non-transitory memory;
an interface for communicating with a display device and one or more input devices; and
one or more programs stored in the non-transitory memory, which, when executed by the one or more processors, cause the device to:
   detect a user input associated with presenting a synthesized reality (SR) experience; and in response to detecting the user input:
- obtain a mesh map for a volumetric region and obtaining SR content with a first set of dimensions;
- adapt the SR content by modifying one or more dimensions of the SR content from the first set of dimensions to a second set of dimensions based on one or more portions of the mesh map; and
- cause presentation of the adapted SR content with the second set of dimensions via the display device.

11. The device of claim 10, wherein the user input is detected while presenting video content that corresponds to the SR experience.

12. The device of claim 11, wherein the one or more programs further cause the device to:
- while presenting the video content and prior to detecting the user input, present, via the display device, a notification indicating that the SR experience associated with the video content is available for playback in response to selection of an associated affordance; and
- wherein the user input corresponds to selection of the associated affordance.

13. The device of claim 11, wherein the video content is presented via the display device of the device.

14. The device of claim 11, wherein the video content is presented via a second device different from the computing system, wherein the second device is communicatively coupled with the device.

15. The device of claim 10, wherein the user input corresponds to one of a voice command or a gestural command detected via the one or more input devices of the device.

16. The device of claim 10, wherein the one or more programs further cause the device to:
- detect a set of planes within the mesh map, wherein the one or more portions of the mesh map correspond to the set of planes; and
- filter out planes from the set of planes that do not satisfy a spatial criterion, wherein the spatial criterion is satisfied when a plane corresponds to at least a threshold surface area.

17. A non-transitory memory storing one or more programs, which, when executed by one or more processors of a device with an interface for communicating with a display device and one or more input devices, cause the device to:
- detect a user input associated with presenting a synthesized reality (SR) experience; and
- in response to detecting the user input:
  - obtain a mesh map for a volumetric region and obtaining SR content with a first set of dimensions;
  - adapt the SR content by modifying one or more dimensions of the SR content from the first set of dimensions to a second set of dimensions based on one or more portions of the mesh map; and
  - cause presentation of the adapted SR content with the second set of dimensions via the display device.

18. The non-transitory memory of claim 17, wherein the user input is detected while presenting video content that corresponds to the SR experience.

19. The non-transitory memory of claim 18, wherein the one or more programs further cause the device to:
- while presenting the video content and prior to detecting the user input, present, via the display device, a notification indicating that the SR experience associated with the video content is available for playback in response to selection of an associated affordance; and
- wherein the user input corresponds to selection of the associated affordance.

20. The non-transitory memory of claim 18, wherein the video content is presented via the display device of the device.

21. The non-transitory memory of claim 18, wherein the video content is presented via a second device different from the computing system, wherein the second device is communicatively coupled with the device.

22. The non-transitory memory of claim 17, wherein the user input corresponds to one of a voice command or a gestural command detected via the one or more input devices of the device.

23. The non-transitory memory of claim 17, wherein the one or more programs further cause the device to:
- detect a set of planes within the mesh map, wherein the one or more portions of the mesh map correspond to the set of planes; and
- filter out planes from the set of planes that do not satisfy a spatial criterion, wherein the spatial criterion is satisfied when a plane corresponds to at least a threshold surface area.

* * * * *